United States Patent [19]

Bailey

[11] Patent Number: 5,315,880
[45] Date of Patent: May 31, 1994

[54] METHOD FOR MEASURING FLUID VELOCITY BY MEASURING THE DOPPLER FREQUENCY SHIFT OR MICROWAVE SIGNALS

[75] Inventor: Michael R. Bailey, Bowling Green, Ohio

[73] Assignee: Henry Filters, Inc., Bowling Green, Ohio

[21] Appl. No.: 928,710

[22] Filed: Aug. 13, 1992

[51] Int. Cl.$^5$ .............................................. G01F 1/66
[52] U.S. Cl. .................................. 73/861.25; 324/642
[58] Field of Search ................. 324/160, 637, 642; 342/22, 104; 73/861, 861.25, 223, 227; 367/151, 152, 153, 154

[56] References Cited

U.S. PATENT DOCUMENTS

| | | | |
|---|---|---|---|
| 3,498,290 | 3/1970 | Shaw et al. | 73/861.25 |
| 3,550,070 | 12/1970 | McLead, Jr. | 73/861.25 |
| 3,554,030 | 1/1971 | Peronneau | 73/861.25 |
| 3,940,731 | 2/1976 | Cooper et al. | 340/3 D |
| 4,103,679 | 8/1978 | Aronson | 73/861.25 |
| 4,167,736 | 9/1979 | Tomlinson | 343/5 NA |
| 4,202,211 | 5/1980 | Perry | 73/227 |
| 4,217,777 | 8/1980 | Newman | 73/198 |
| 4,254,482 | 3/1981 | Newman | 367/87 |
| 4,397,194 | 8/1983 | Soltz | 73/861.28 |
| 4,540,946 | 9/1985 | Sainz et al. | 73/861.25 |
| 4,642,777 | 2/1987 | Schwanke | 324/642 |
| 5,031,628 | 7/1991 | Nakamura et al. | 73/861.25 |
| 5,046,500 | 9/1991 | Fehr | 73/861.25 |
| 5,056,357 | 10/1991 | Dymling et al. | 73/54 |
| 5,103,826 | 4/1992 | Bonnefous | 73/861.25 |
| 5,175,709 | 12/1992 | Slayton et al. | 367/90 |

*Primary Examiner*—Richard E. Chilcot, Jr.
*Assistant Examiner*—William L. Oen
*Attorney, Agent, or Firm*—Brooks & Kushman

[57] ABSTRACT

A non-invasive method for measuring the velocity of a fluid surface flowing in a predetermined direction in a channel or flume 10 includes the steps of generating a microwave frequency electrical signal adapted to reflect from the fluid surface; spacing the generation of the electrical signal from the fluid surface; directing the signal along a line toward the fluid surface and opposite the predetermined direction and at an angle of between 30° and 40° to the fluid surface; detecting the signal reflected from the fluid surface; and determining from the directed and reflected signal the Doppler frequency shift therebetween as a measure of the velocity of the fluid surface.

8 Claims, 1 Drawing Sheet

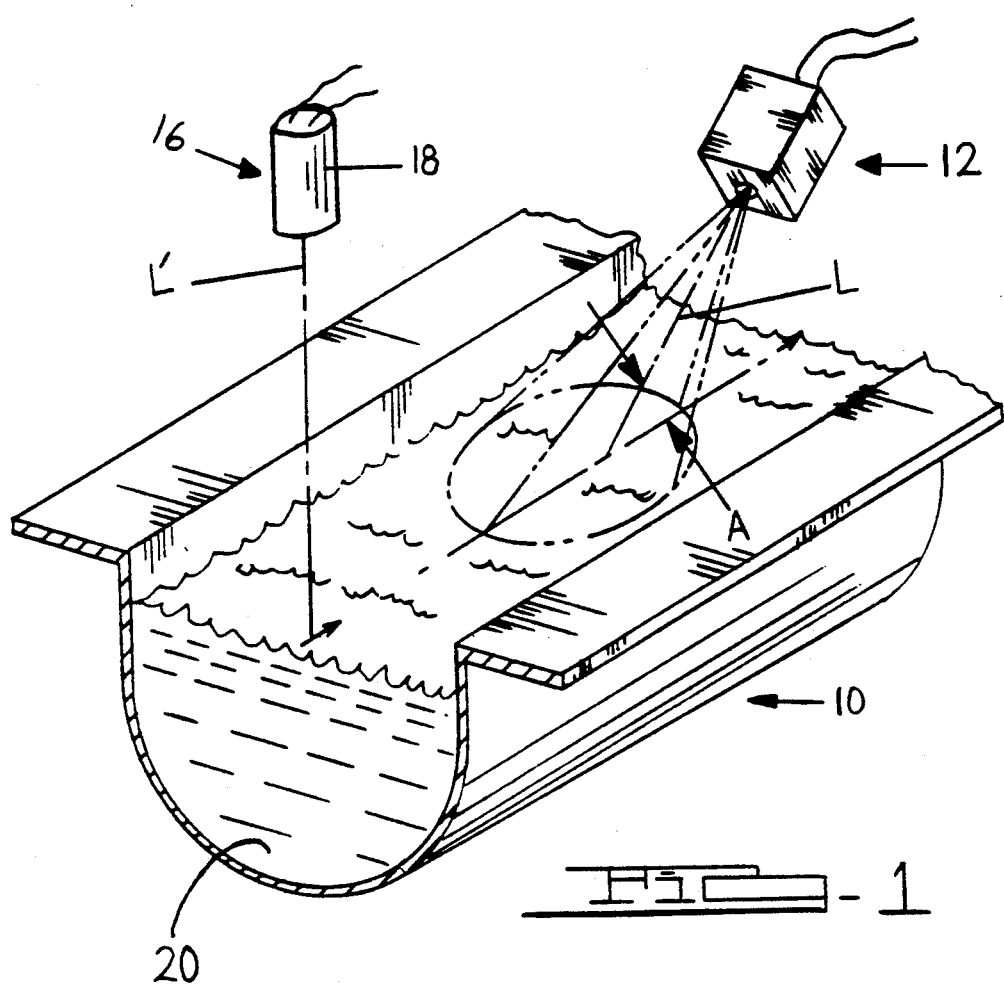

METHOD FOR MEASURING FLUID VELOCITY BY MEASURING THE DOPPLER FREQUENCY SHIFT OR MICROWAVE SIGNALS

TECHNICAL FIELD

This invention relates to a method for measuring fluid flow and more particularly to a non-invasive method for measuring the velocity of a fluid surface that can be coupled with a depth measurement to determine the flow rate of the fluid.

BACKGROUND ART

Conventional fluid flow measurement devices such as described in U.S. Pat Nos. 4,397,194; 4,217,777; 4,202,211; and 3,498,290 use ultrasonic techniques for measuring fluid flow. The 4,397,194 patent discloses an ultrasonic flow meter wherein an acoustic pulse is transmitted by one transducer and propagated to the fluid at an angle to the longitudinal flow axis and received by another transducer. The time delay difference between the upstream and downstream transit times which depends on full velocity was determined to provide a flow rate reading.

The 4,217,777 patent discloses a sonic detector having a head which is positionable at different distances from the base of a channel and provides data signals corresponding to the transit time for sonic signals between the top of the liquid in the head, which signals are variable with the level of the liquid in the channel. A liquid velocity detector provides data signals which vary with the velocity of the liquid flowing through an area in the channel.

The 4,202,211 patent discloses a non-invasive system for measuring liquid flow through channels. The system utilizes an ultrasonic Doppler velocity detector which is positionable in a space below the channel and provides data signals which vary with the velocity of the liquid flow through an area in the channel. The system also utilizes a unit which responds to the variable data signals and the constant data signals to provide an output representing the flow through the channel in terms of the product of the area of the cross-sectional profile of the channel through which the fluid is flowing and the velocity of the fluid.

The 3,498,290 patent discloses a volumetric blood flow meter in which a first transducer locates and measures the diameter of a vessel and a second transducer determines the velocity of blood in the vessel by Doppler frequency shift techniques. This flow meter measures volumetric blood flow in an undisturbed vessel of a patient from the surfaces of his body.

U.S. Pat. No. 4,254,482 discloses the use of sonic signals for measuring the flow rate and liquid level of a fluid flowing in a channel. An echo location system operates to detect returns of reflected sonic signals from the surface of the liquid in a channel during successive transmission cycles.

Another, more accurate, technique for measuring fluid flow is accomplished through the invasive use of microwave radiation.

U.S. Pat. No. 4,167,736 discloses a method of using microwave radiation and Doppler frequency shift techniques to measure fluid flow. This is accomplished by generating a microwave frequency electrical signal, passing the signal to an aerial for radiation into the fluid, detecting the radiated signal after reflection by the fluid, determining from the radiated and reflected signals the Doppler frequency shift in between as a measure of the fluid flow rate. This type of monitoring is done through obtrusive contact with the fluid.

Although the use of microwave radiation is useful as an accurate measurement tool, the invasive nature of the method and equipment makes its use for contaminant-laden fluids, such as circulating machine tool coolant, undesirable. Such equipment becomes rapidly coated with contaminant and the accuracy of the measurements is eliminated.

DISCLOSURE OF THE INVENTION

An object of the present invention is to provide an improved non-invasive method for measuring the velocity of fluid surface flowing in a channel or flume.

Another object of the present invention is to provide a non-invasive method for measuring the velocity of fluid surface that utilizes radar technology.

Still another object of the present invention is to provide an improved non-invasive method for measuring the flow rate of a fluid flowing in a channel or flume.

In carrying out the above objects and other objects of the invention, the non-invasive method for measuring the velocity of fluid surface flowing in a predetermined direction in a channel or flume includes the steps of generating a microwave frequency electrical signal adapted to reflect from the fluid surface; spacing the generation of the electrical signal from the fluid surface; directing the signal along a line toward the fluid surface and opposite the predetermined direction at an angle of between 30 and 40 degrees to the fluid surface; detecting the signal reflected from the fluid surface; and determining from the directed and reflected signal the Doppler frequency shift therebetween as a measure of the velocity of the fluid surface.

In an alternative embodiment of the invention, the steps outlined for measuring the velocity of fluid surface flowing in a predetermined direction in a channel or flume are combined with the steps of measuring the depth of the fluid in the channel or flume; and determining from the velocity of the fluid surface and the depth of the fluid in the channel or flume, the flow rate of the fluid. Preferably, the depth measurement is ultrasonically obtained.

The ultrasonic depth measurement includes the steps of generating an ultrasonic signal adapted to reflect from the fluid surface; spacing the generation of the ultrasonic signal a predetermined distance above the channel or flume bottom; directing the ultrasonic signal downwardly at the fluid surface; detecting the ultrasonic signal reflected from the fluid surface; and determining from the reflected ultrasonic signal the difference in length between the channel or flume bottom and the fluid surface as a measure of the depth of the fluid in the channel or flume.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a perspective view of a channel or flume having a liquid flowing in a predetermined direction therein illustrating a radar velocity sensor mounted above the fluid surface and directing a signal along a line toward the fluid surface and opposite the predetermined direction to be used in determining from the directed and reflected signal the velocity of the fluid surface.

BEST MODE FOR CARRYING OUT THE INVENTION

Referring to FIG. 1 of the drawings, an environment is illustrated for providing an improved non-invasive method for measuring the velocity of fluid surface flowing in a predetermined direction in a channel or flume 10. This non-invasive method utilizes radar technology and avoids equipment problems associated with the emersion of radar equipment into contaminated fluids. This non-invasive radar method of determining velocity can be combined with non-invasive ultrasonic depth measuring techniques to determine flow rate.

As shown in FIG. 1, a radar velocity sensor 12 is mounted above the fluid surface of the fluid flowing in channel or flume 10. A suitable radar velocity sensor is that known as DjRVS II sensor supplied by the Dickey-john ® Corporation of Auburn, Ill. The radar velocity sensor 12 is mounted above the fluid surface such that a microwave frequency electrical signal adapted to reflect from the fluid surface and generated by the radar velocity sensor is directed along a line, referred to as L, at an angle A of between 30° and 40° to the fluid surface.

Preferably, the spacing of the radar velocity sensor 12 is between 18 and 48 inches above the fluid surface. The spacing is arranged so that the directed signal L has an unobstructed cone-shaped view of the fluid surface.

The microwave frequency electrical signal generated by the radar velocity sensor 12 is reflected from the fluid surface and the velocity of fluid surface is determined by the Doppler frequency shift between the directed and reflected signal.

Such a non-invasive arrangement avoids the collection of fluid contaminants associated with fluid intrusive devices.

In an alternative arrangement of the invention, the flow rate of the fluid flowing in channel or flume 10 is determinable. An ultrasonic depth measurement system 16 is used to calculate the depth of the fluid in the channel or flume 10, of which we know the cross-sectional shape. By multiplying the area of the cross-sectional profile of the fluid times its surface velocity, we can obtain the flow rate of the fluid.

With further reference to FIG. 1, an ultrasonic depth sensor 18 is mounted above the channel or flume bottom 20 and above the fluid surface. A suitable ultrasonic depth sensor is that known as Agastag ultrasonic proximity sensor supplied by Electro Corp. of Sarasota, Fla. The depth sensor 18 generates an ultrasonic signal, referred to as L', adapted to reflect from the fluid surface. The ultrasonic signal L' is directed downwardly at the fluid surface and upon striking the fluid surface is reflected upwardly. The depth of the fluid in the channel or flume 10 is determined from the difference in the length of the signal reflected from the fluid surface and that of a signal reflected from the channel or flume bottom 20.

While the best mode for carrying out the invention has been described in detail, those familiar with the art to which this invention relates will recognize various alternative designs and embodiments for practicing the invention as defined by the following claims.

What is claimed:

1. A non-invasive method for measuring the velocity of a free fluid surface flowing in a predetermined direction in an open channel or flume of a fixed shape comprising the steps of:
   generating a microwave frequency electrical signal adapted to reflect from said fluid surface using a means to generate said electrical signal;
   spacing the means to generate said electrical signal from said fluid surface;
   directing said signal along a line toward the fluid surface and opposite the predetermined direction and at an angle of between 30 and 40 degrees to said fluid surface;
   detecting the signal reflected from the fluid surface; and
   determining from the directed and reflected signal the Doppler frequency shift therebetween as a measure of the velocity of the fluid surface.

2. The method of claim 1 wherein said directed signal forms a pattern on the fluid surface of an oval shape.

3. The method of claim 2 wherein said spacing is arranged so that said directed signal has an unobstructed cone-shaped view of the fluid surface.

4. The method of claim 3 wherein said spacing is generally between 18 and 48 inches.

5. The method of claim 1 comprising the additional steps of:
   measuring the depth of the fluid in the channel or flume; and
   determining from the velocity of the fluid surface and the depth of the fluid in the channel or flume, the flow rate of the fluid.

6. The method of claim 5 wherein the depth measurement is ultrasonically obtained.

7. The method of claim 6 wherein said ultrasonic measurement is non-invasive.

8. The method of claim 7 wherein said non-invasive method includes the steps of:
   generating an ultrasonic acoustic signal adapted to reflect from said fluid surface using a means to generate said ultrasonic signal;
   spacing the means to generate said ultrasonic signal a predetermined distance above the open channel or flume bottom and above the fluid surface;
   directing said ultrasonic signal downwardly at said fluid surface;
   detecting the ultrasonic signal reflected from the fluid surface; and
   determining from the reflected ultrasonic signal the difference in length therebetween the open channel or flume bottom and fluid surface as a measure of the depth of the fluid in the open channel or flume.

* * * * *